United States Patent [19]

Sun et al.

[11] 4,208,687

[45] Jun. 17, 1980

[54] PROTECTIVE RELAY APPARATUS

[75] Inventors: Shan C. Sun, Bell Township, Westmoreland County; Larry L. Church, Washington Township, Fayette County, both of Pa.

[73] Assignee: Westinghouse Electric Corp., Pittsburgh, Pa.

[21] Appl. No.: 959,045

[22] Filed: Nov. 8, 1978

[51] Int. Cl.² .............................................. H02H 7/06
[52] U.S. Cl. ...................................... 361/20; 361/76; 361/113; 340/658
[58] Field of Search ...................... 361/20, 21, 79, 87, 361/86, 76, 110, 111, 113, 182–184; 324/77 R, 77 E, 107, 108, 78 F; 322/58, 24, 25, 32; 340/658

[56] References Cited

U.S. PATENT DOCUMENTS

| 3,813,593 | 5/1974 | Tice et al. | 361/113 |
| 3,992,651 | 11/1976 | Hodges | 361/86 X |

*Primary Examiner*—Patrick R. Salce
*Attorney, Agent, or Firm*—D. R. Lackey

[57] ABSTRACT

Protective relay apparatus which includes monitoring and detecting functions related to subsynchronous currents in a three-phase electrical power system. The monitoring function provides signals related to the positive sequence component of any subsynchronous current flowing at a monitored subsynchronous frequency. The detecting function is responsive to the signals provided by the monitoring function, distinguishing between subsynchronous currents due to self-excited oscillations, and those due to transient oscillations, to provide a timely trip signal for a circuit breaker in either instance.

10 Claims, 8 Drawing Figures

PROTECTIVE RELAY APPARATUS

BACKGROUND OF THE INVENTION

1. Field of the Invention

The invention relates in general to protective relays, and more specifically to protective relays for protecting electrical machines connected to an electrical power system from the effects of harmful subsynchronous oscillations.

2. Description of the Prior Art

Turbine generators which generate electrical power have been severely damaged by shaft torques produced by electrically initiated mechanical oscillations at resonant frequencies of the mechanical system. Damaging oscillations may build slowly due to interaction between the electrical power system and the mechanical system of the turbine generator; or, a transient of high magnitude, such as due to a short circuit on a series-compensated transmission system, may provide a "shock" torque which initiates a subsynchronous oscillation of the mechanical system at a resonant frequency.

Many different approaches have been used to try to solve the problem presented by subsynchronous oscillations, such as by inserting electrical power filters into the electrical line to block or dampen subsynchronous currents. Also, additional control has been provided for series capacitors, which reduces short circuit current magnitudes. Additional control has also been provided in the excitation system of the turbine generator, which increases system damping. These approaches to solving the problem, however, may malfunction or fail. Such failure, for example, may be the result of filter detuning, drift of the electrical power system from the synchronous frequency, or failure of initiating signals to reach the series capacitor control. Also, since the problem is very complex, the "solution" may not protect the system against subsynchronous resonance from all possible causes. Thus, it would be desirable to back any solution to the subsynchronous resonance problem with the application of a protective relay which detects an unacceptable subsynchronous oscillation condition and either provides a trip signal for a circuit breaker to remove the apparatus to be protected, such as a turbine generator, from the line, or it initiates some other form of corrective action.

A protective relay for such a function must distinguish between subsynchronous oscillations which are potentially harmful, and those which are not, as a turbine generator should only be tripped from the line when damage producing oscillation thereof is imminent. However, since such oscillations may be produced in a very short period of time, the processing speed of the relay must be fast enough to provide the detection and corrective action before actual damage occurs. The protective relay must have a wide operating range and a sensitivity which will detect 0.01 PU (per unit) of subsynchronous current in the presence of a synchronous (i.e., 60 hertz) current of many PU. The subsynchronous current may also have a magnitude of many PU.

Copending application Ser. No. 757,177, filed Jan. 6, 1977, in the name of S. C. Sun, entitled "Apparatus for Detecting Subsynchronous Current in Power Systems", which application is assigned to the same assignee as the present application, now U.S. Pat. No. 4,125,884 discloses new and improved monitoring apparatus for providing a signal responsive to subsynchronous current flowing in an electrical power system. A signal responsive to a current in one of the phases of the electrical power system is multiplied by a reference signal having a synchronous frequency and a constant amplitude. The product contains components having frequencies equal to: (1) twice the synchronous frequency, (2) the sum of the synchronous frequency and each subsynchronous frequency, and (3) the difference between the synchronous frequency and each subsynchronous frequency. A wide band or bandpass filter passes component (3) which relates directly to subsynchronous oscillation frequencies, while substantially blocking or attenuating components (1) and (2).

Our co-pending application Ser. No. 757,178, filed Jan. 6, 1977, entitled "Apparatus for Protection Against Subsynchronous Currents in a Power System", which application is also assigned to the same assignee as the present application, now U.S. Pat. No. 4,106,071 discloses detection apparatus for processing a signal responsive to subsynchronous current in an electrical power system, such as the signal (3) hereinbefore referred to. This detection apparatus provides a trip signal in response to a growing oscillation in the frequency range of interest, such as 15 to 45 hertz, when the oscillation exceeds a predetermined threshold magnitude, and a predetermined magnitude at the end of a predetermined period of time.

SUMMARY OF THE INVENTION

Briefly, the present invention is a new and improved protective relay which includes monitoring and detector apparatus responsive to the current flowing in a three-phase electrical power system having a three-phase voltage generated at a synchronous power frequency. The monitoring apparatus includes a synchronous modulator or multiplier which multiplies the current in each phase of the three-phase system by a reference signal having a frequency equal to the synchronous frequency, and a constant magnitude. The monitoring apparatus also includes filters for processing the signals which are output from the multiplying apparatus. The filters separate the subsynchronous current components from the synchronous components, and provide a signal responsive to the positive sequence component of the subsynchronous current, at each of one or more discrete subsynchronous frequencies monitored. The mechanical resonance frequency, or frequencies, of the turbine generator to be protected are known, and thus the monitoring apparatus is tuned to these frequencies. The positive sequence component of a subsynchronous current is the torque producing component, and thus the monitoring apparatus provides a more reliable and accurate indication of a potentially-damaging subsynchronous oscillation.

The detection apparatus provides means for distinguishing between self-excited subsynchronous current oscillations which have a relatively low initial amplitude and can be safely evaluated over a predetermined period of time to determine their rate of rise, from transient initiated subsynchronous oscillations which have a relatively large initial amplitude, and which decay with time. A large amplitude subsynchronous oscillation at a monitored frequency will cause the detection apparatus to initiate a trip signal as soon as the associated signal exceeds a predetermined magnitude, providing faster protection than the apparatus which protects against the self-excited, growing subsynchronous oscillation.

BRIEF DESCRIPTION OF THE DRAWING

The invention may be better understood and further advantages and uses thereof more readily apparent, when considered in view of the following detailed description of exemplary embodiments, taken with the accompanying drawings in which.

DESCRIPTION OF PREFERRED EMBODIMENTS

Figure 1:
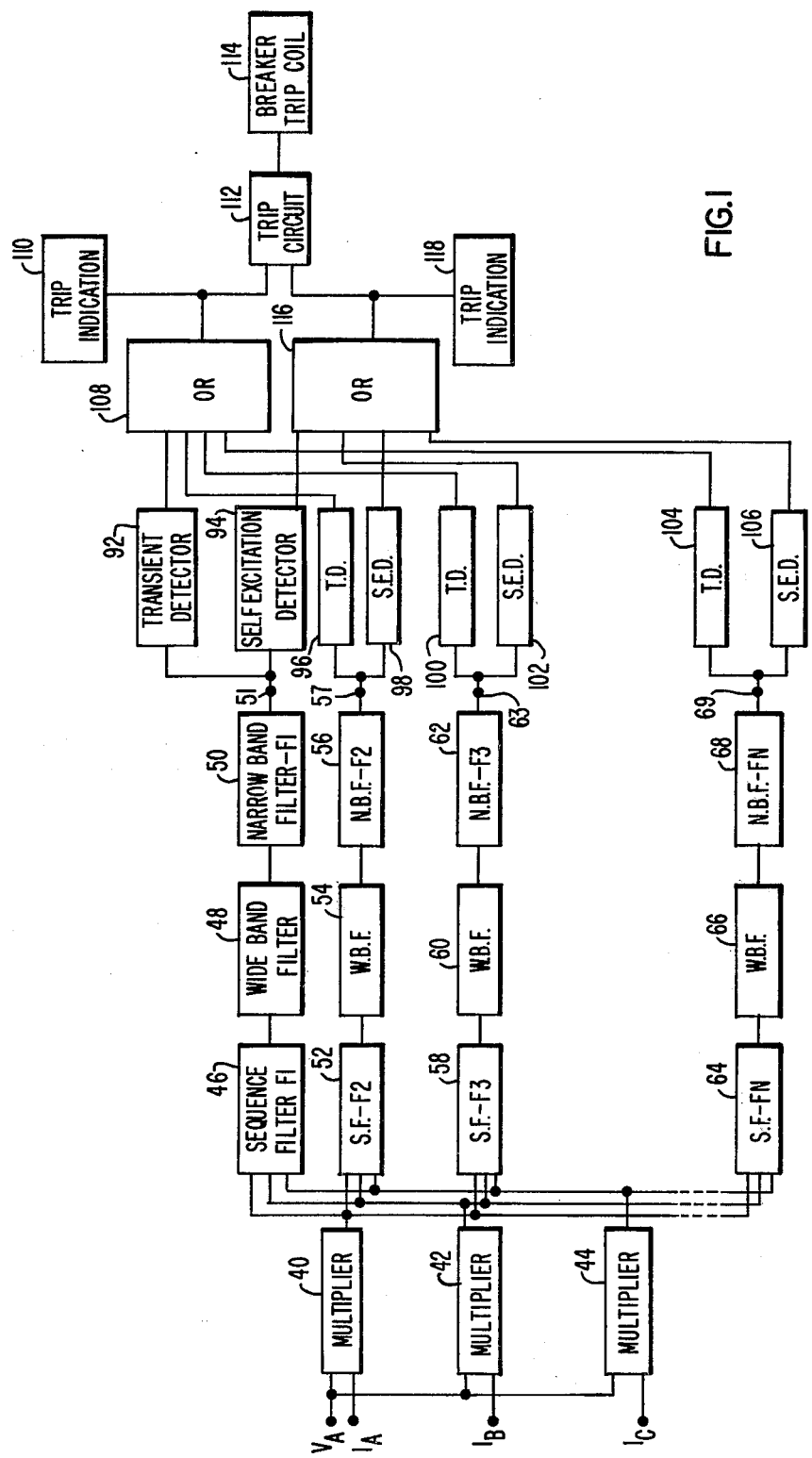
FIG. 1 is a block diagram of protective relay apparatus constructed according to the teachings of the invention.

Referring now to the drawings, and to FIG. 1 in particular, there is shown a new and improved protective relay 10 constructed according to the teachings of the invention. Certain of the functions shown in block form in FIG. 1 may be performed by circuitry shown and described in detail in the hereinbefore-mentioned commonly assigned co-pending applications. Accordingly, application Ser. Nos. 757,177 and 757,178 are hereby incorporated into the present application by reference.

The present invention provides a more accurate and reliable indication of harmful subsynchronous currents by monitoring only a selected specific subsynchronous frequency, or selected frequencies, which frequency, or frequencies, are known to be mechanical resonant frequencies of the specific machine to be protected. While the invention will be primarily described from the viewpoint of protecting a turbine generator, it will be understood that the protective relay may also be used for protecting other large machines connected to a three-phase electrical power system, such as induction generators and motors. Accuracy and reliability are further enhanced by providing subsynchronous current signals which are responsive to the positive sequence component of the subsynchronous current at the monitored frequency, or frequencies, as only the positive sequence component is capable of providing damaging shaft torques. Still further, it is felt that the three-phase approach of the invention, required by the determination of a positive sequence component, presents a more complete representation of a subsynchronous current, than a single-phase approach.

Figure 2:
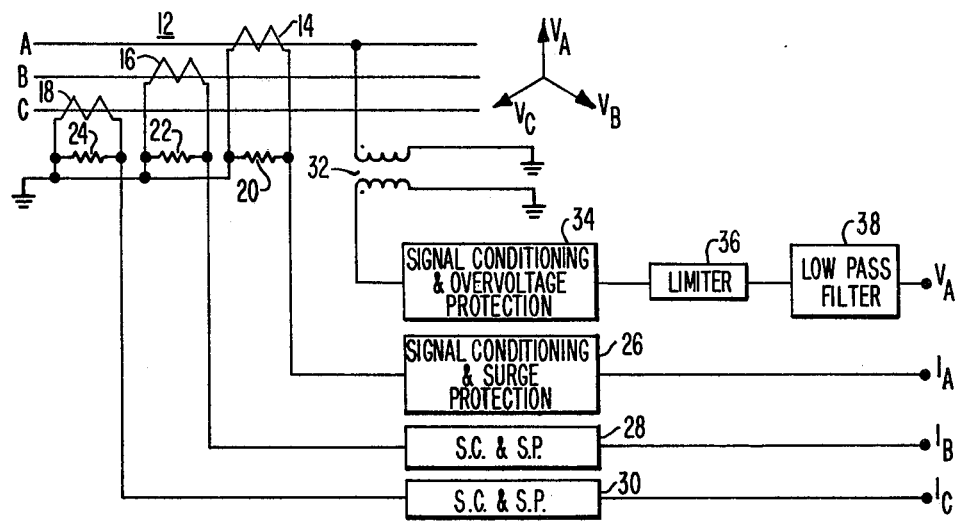
FIG. 2 is a schematic diagram illustrating an arrangement which may be used to provide current related signals, and a reference signal, required by the protective relay apparatus of claim 1.

Protective relay 10 requires certain current-related signals $I_A$, $I_B$ and $I_C$ from the electrical power system being monitored, and a reference signal $V_A$. The reference signal $V_A$ may also be conveniently provided from a line voltage of the electrical power system. FIG. 2 illustrates a three-phase electrical power system 12 having conductors A, B, and C connected to the turbine generator being protected. The generator generates a three-phase voltage at a synchronous frequency, such as 60 hertz. Current transformers 14, 16 and 18 provide current signals responsive to the current flowing in conductors A, B and C, respectively, and resistors 20, 22 and 24 convert the current signals to voltage form. The signal voltages responsive to the current flowing in conductors A, B and C are applied to signal conditioning and surge protection circuitry 26, 28 and 30, respectively. This circuitry, which may include an operational amplifier active filter and zener diodes for suppressing high frequency noise and limiting current surges, is shown in detail in the incorporated application Ser. No. 757,177. The outputs of circuits 26, 28 and 30 provide current related signals $I_A$, $I_B$ and $I_C$ for protective relay 10 shown in FIG. 1, and they will contain subsynchronous components and subsynchronous currents which are flowing in the electrical power system 12.

The reference signal $V_A$ is a sinusoidal voltage at the synchronous frequency, having a constant amplitude. As illustrated in FIG. 2, it may be provided by a potential transformer 32 having a primary winding connected to one of the line conductors, such as conductor A, and a secondary winding connected to signal conditioning and overvoltage protective circuitry 34. The conditioned voltage signal is applied to a limiter 36 which forms a square wave of constant amplitude at the synchronous frequency, and to a low pass active filter 38 which converts the square wave to a sinusoid. Low pass filter 38 also includes A.C. coupling means, such as a capacitor, to couple the output of the filter to the output terminal $V_A$, to remove any D.C. component in the signal. Circuitry 34, limiter 36 and low pass filter 38 are shown in detail in the incorporated application Ser. No. 757,177.

Returning again to FIG. 1, the current related voltage signals $I_A$, $I_B$ and $I_C$ are each multiplied by the reference signal $V_A$ in synchronous modulators or multipliers 40, 42 and 44, respectively. The multiplication function may be performed by a precision analog multiplier, such as one of Intronix Corporation M310 series. As explained in the incorporated application Ser. No. 757,177, the multiplication function eliminates the synchronous frequency component $\omega_0$ and provides a signal with three components, (1) a double synchronous frequency term $2\omega_0$, (2) a beat frequency term $(\omega_0 + \omega_s)$ for each subsynchronous current frequency $\omega_s$ present, and (3) a beat frequency term $(\omega_0 - \omega_s)$ for each subsynchronous current frequency present. In the incorporated application Ser. No. 757,177, a bandpass filter attenuates the relatively high frequency components (1) and (2), providing a signal (3) related to all of the subsynchronous components $(\omega_0 - \omega_s)$ flowing in one of the line conductors of the electrical power system. This signal is then used by detector apparatus disclosed in the second incorporated application Ser. No. 757,178. The single-phase approach of the two incorporated applications could be applied to each line of a three-phase system, providing three different signals related to subsynchronous current flowing in the three line conductors of the system. The present invention utilizes certain of the teachings of each of the incorporated applications to provide a new and improved three-phase protective relay which differs from the incorporated applications by: (a) filtering the subsynchronous current signal with a sequence filter and with a narrow band filter, to provide a signal related to the positive sequence component of each discrete subsynchronous current frequency of interest, and (b) by recognizing that additional protection may be provided by distinguishing between the relatively slow, self-excited subsynchronous current oscillation which grows in magnitude, and a transient subsynchronous oscillation of high initial magnitude which may shock the turbine generator into mechanical resonance.

Figure 3:
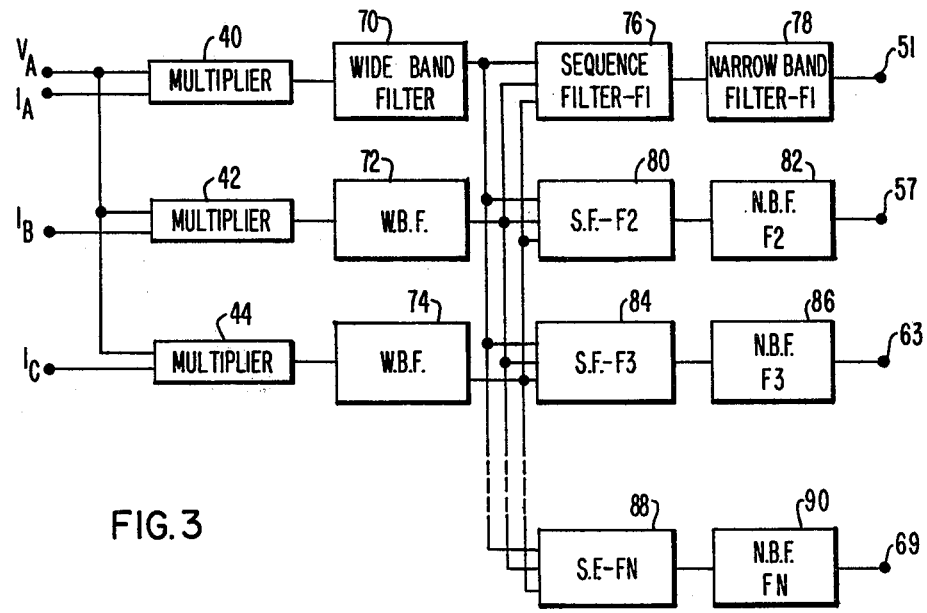
FIG. 3 is a block diagram which illustrates a modification of the protective relay apparatus shown in FIG. 1, according to another embodiment of the invention.

The outputs of multipliers 40, 42 and 44 must be filtered with a bandpass or wide band filter at some point, to attenuate the two $\omega_0$ and $(\omega_0+\omega_s)$ terms, while passing the $(\omega_0-\omega_s)$ term, and a pair of filters, comprising a sequence filter and a narrow band filter, are provided for each subsynchronous frequency to be monitored. The filtering system is a linear system and the filtering may be applied in any order. The order selected is based on hardware considerations, as will be hereinafter explained. FIGS. 1 and 3 illustrate two different filtering sequences which may be used.

More specifically, FIG. 1 illustrates a sequence filter 46 tuned to a predetermined subsynchronous current frequency F1. Normally, frequency F1, and any other monitored frequency, will be in the range of 15 to 45 hertz. Sequence filter 46 has its input connected to be responsive to the outputs of all of the multipliers 40, 42 and 44. The sequence filter gives valid results for only the tuned frequency, but it operates on all frequency components from the multipliers. Subsequent filtering by a wideband filter 48, and a narrow band filter 50 tuned to the same frequency F1 as the sequence filter 46, provides a signal at the output 51 of the narrow band filter 50 responsive to the positive sequence component of the specific subsynchronous frequency F1.

In order to provide an output signal responsive to the positive sequence component of the specific subsynchronous current frequency F1, the sequence filter 46 must be a negative sequence filter, as the sequence phase relationships have been reversed by the multiplication function. This is shown by the following:

The sequence components of a certain subsynchronous frequency, $\omega_s$, in a given system are:

$$
\begin{aligned}
I_0 &= I_\alpha \cos \omega_s t &\text{zero sequence,} \\
I_1 &= I_\beta \cos (\omega_s t + \phi_1) &\text{positive sequence, and} \\
I_2 &= I_\gamma \cos (\omega_s t + \phi_2) &\text{negative sequence.}
\end{aligned}
\tag{1}
$$

Thus, by definition, the phase currents of $\omega_s$ are, in phasor notation:

$$
\begin{aligned}
I_{AS} &= I_0 + I_1 + I_2, \\
I_{BS} &= I_0 + a^2 I_1 + a I_2, \text{ and} \\
I_{CS} &= I_0 + a I_1 + a^2 I_2
\end{aligned}
\tag{2}
$$

where $a = e^{j120}$.

Substituting (1) into (2):

$$
\begin{aligned}
I_{AS} &= I_\alpha \cos \omega_s t + I_\beta \cos (\omega_s t + \phi_1) + I_\gamma \cos (\omega_s t + \phi_2), \\
I_{BS} &= I_\alpha \cos \omega_s t + I_\beta \cos (\omega_s t + \phi_1 + 240°) + I_\gamma \cos (\omega_s t + \phi_2 + 120°), \text{ and} \\
I_{CS} &= I_\alpha \cos \omega_s t + I_\beta \cos (\omega_s t + \phi_1 + 120°) + I_\gamma \cos (\omega_s t + \phi_2 + 240°).
\end{aligned}
\tag{3}
$$

Now assume that $V_A = \cos \omega_0 t =$ a normalized form of the A phase voltage, where $\omega_0 = 2\pi 60$. After multiplication and bandpass filtering, to remove the DC, 120 Hz and $(\omega_0+\omega_s)$ terms, the subsynchronous current signals are:

$$
\begin{aligned}
I_{AS}' &= I_\alpha \cos (\omega_0-\omega_s)t + I_\beta \cos [(\omega_0-\omega_s)t - \phi_1] + I_\gamma \cos [(\omega_0-\omega_s)t - \phi_2], \\
I_{BS}' &= I_\alpha \cos (\omega_0-\omega_s)t + I_\beta \cos [(\omega_0-\omega_s)t - \phi_1 - 240°] + I_\gamma \cos [(\omega_0-\omega_s)t - \phi_2 - 120°] \text{ and} \\
I_{CS}' &= I_\alpha \cos (\omega_0-\omega_s)t + I_\beta \cos [(\omega_0-\omega_s)t - \phi_1 - 120°] + I_\gamma \cos [(\omega_0-\omega_s)t - \phi_2 - 240°];
\end{aligned}
\tag{4}
$$

or $$
\begin{aligned}
I_{AS}' &= I_0' + I_1' + I_2' &I_0' &= I_\alpha \cos (\omega_0-\omega_s)t \\
I_{BS}' &= I_0' + aI_1' + a^2 I_2' \text{ where} &I_1' &= I_\beta \cos [(\omega_0-\omega_s)t - \phi_1] \\
I_{CS}' &= I_0' + a^2 I_1' + a I_2' &I_2' &= I_\gamma \cos [(\omega_0-\omega_s)t - \phi_2]
\end{aligned}
\tag{5}
$$

From this we see that $I_{AS}'$, $I_{BS}'$ and $I_{CS}'$ constitute a set of negative-sequence signals while $I_{AS}$, $I_{BS}$ and $I_{CS}$ are a positive-sequence set. The multiplication has reversed the sequence; therefore, a negative-sequence filter is used for positive-sequence detection.

The negative sequence filter 46, for example, may be the sequence filter disclosed in co-pending application Ser. No. 866,152, filed Dec. 30, 1977, in the name of S. C. Sun, entitled "Symmetrical Component Sequence Filter", which application is assigned to the same assignee as the present application, now U.S. Pat. No. 4,146,913 or any other suitable negative sequence filter may be used.

The wideband filter 48 may be the 17th order (13th order low pass and 4th order high pass) modified Butterworth design shown in detail in the incorporated application Ser. No. 757,177, which has a bandwidth of approximately 30 hertz (15 to 45 hertz).

The narrow band filter 50 preferably has a bandwidth of only a few hertz, such as 3 Hz. For example, the narrow band filter 50 may be 4th order, consisting of two second order bandpass filters, stagger-tuned for maximally flat response at the desired bandwidth. The transfer function of the narrow band filter is:

$$
\frac{a\omega_1 s}{s^2 + a\omega_1 s + \omega_1^2} \cdot \frac{a\omega_2 s}{s^2 + a\omega_2 s + \omega_2^2}
\tag{6}
$$

where $a = 1/Q$ and Q is the desired selectivity of the combined two second order stages.

Additional subsynchronous current frequencies of interest may be monitored by duplicating the filter arrangement for the frequency F1. For example, for a subsynchronous frequency F2, a sequence filter 52, a wideband filter 54, and a narrow band filter 56 would be provided, which provides an output signal at terminal 57. For a subsynchronous frequency F3, a sequence filter 58, a wideband filter 60, and a narrow band filter 62 would be provided, which provides an output signal at terminal 63. For a subsynchronous frequency FN, a sequence filter 64, a wideband filter 66, and a narrow band filter 68 would be provided, which provides an output signal at terminal 69.

In the usual turbine generator system, only two or three mechanical resonance frequencies will be of interest, and the approach of FIG. 1 is the most economical. If four or more subsynchronous frequencies are to be monitored, the approach illustrated in FIG. 3 is the most economical. FIG. 3 requires three wideband filters 70, 72 and 74, regardless of how many subsynchronous frequencies are monitored. A pair of sequence and narrow band filters is connected to receive the outputs of the three wide band filters 70, 72 and 74 for each subsynchronous frequency to be monitored, with a sequence filter 76 and a narrow band filter 78 monitoring a frequency F1, a sequence filter 80 and a narrow band filter 82 monitoring a frequency F2, a sequence filter 84 and a narrow band filter 86 monitoring a frequency F3, and a sequence filter 88 and a narrow band filter 90 monitoring a frequency FN.

Figure 4:
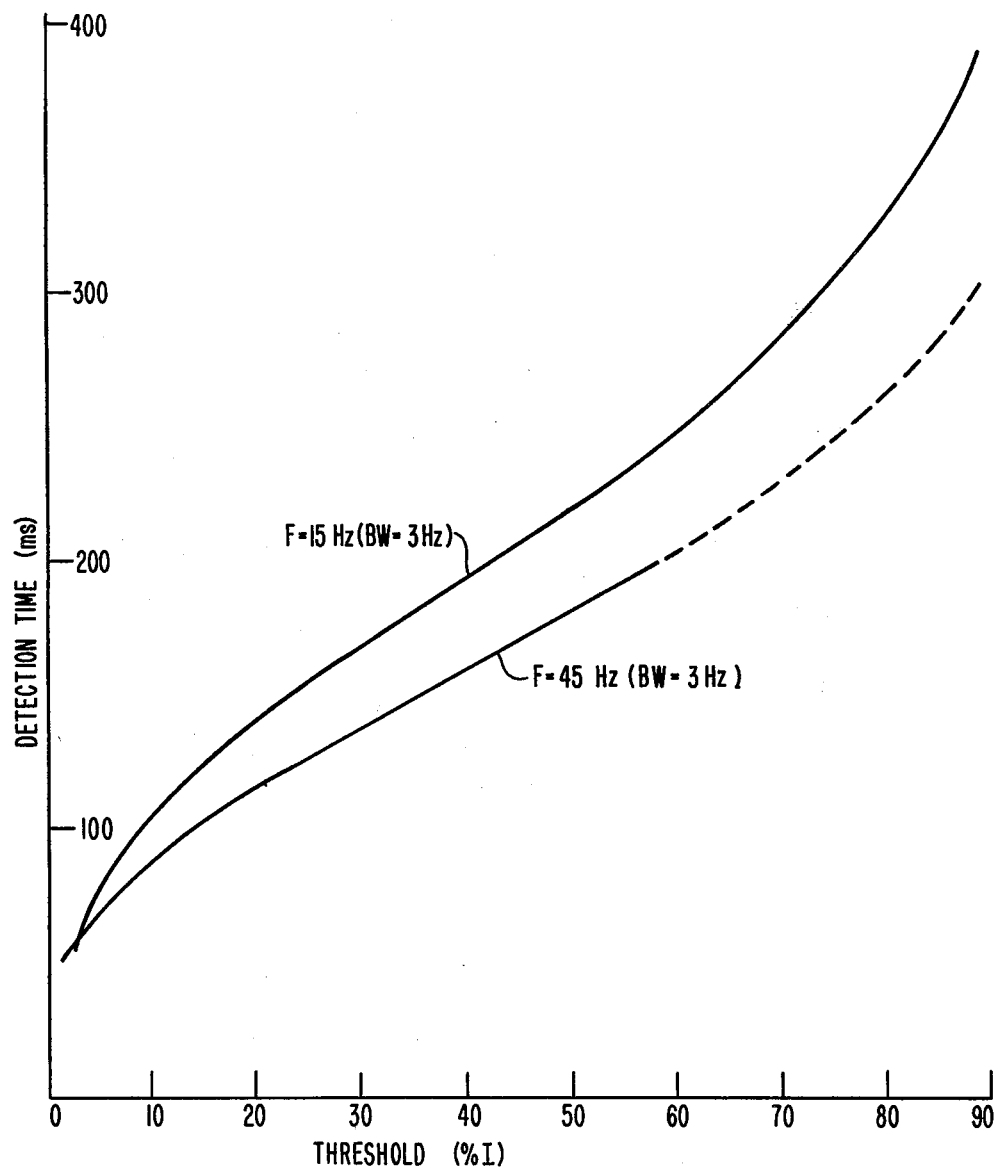
FIG. 4 is a graph which illustrates detection time of the protective relay apparatus of the invention versus the threshold setting, for a 1 PU transient.
Figure 5:
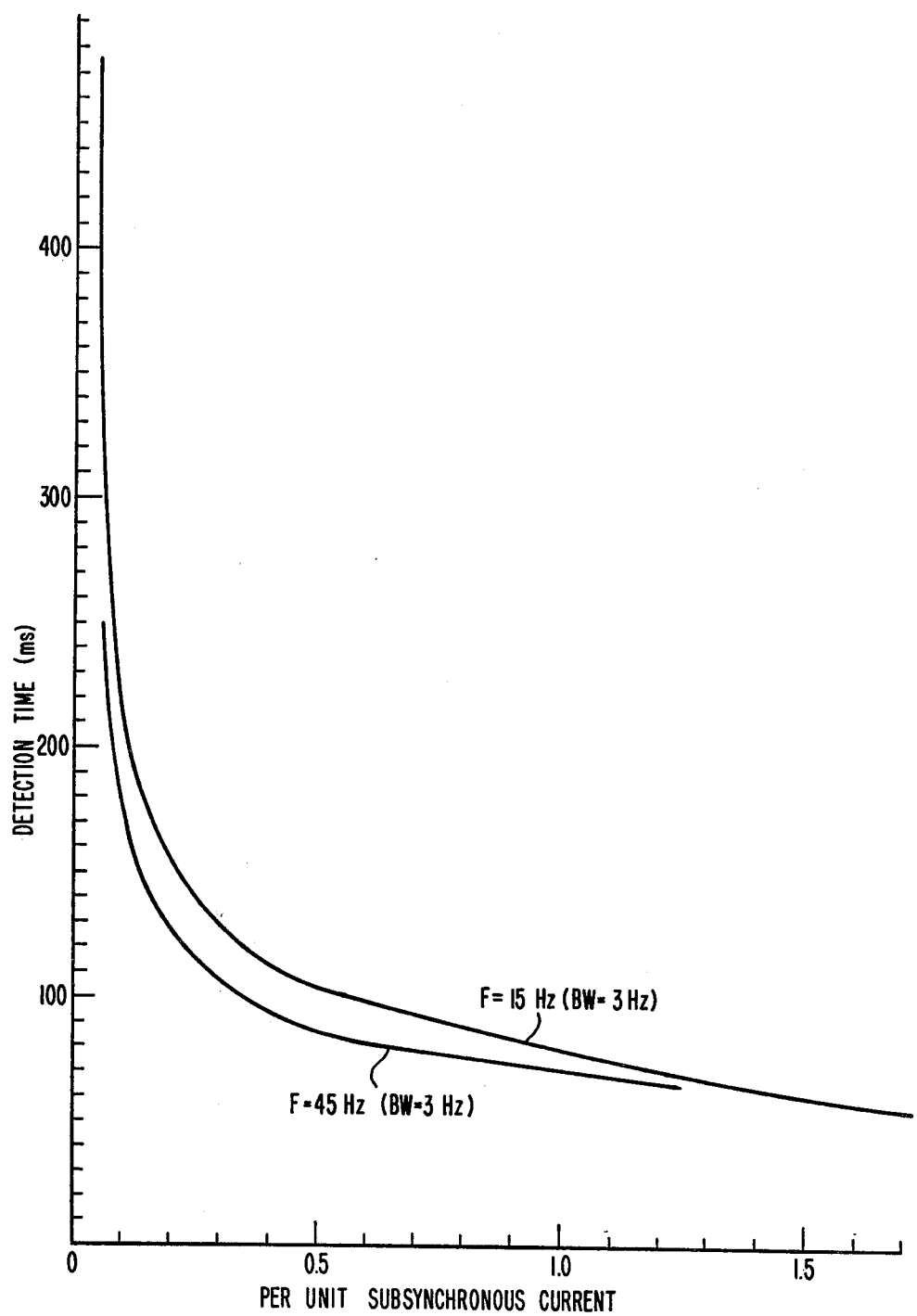
FIG. 5 is a graph which illustrates detection time of the protective relay apparatus of the invention, versus the magnitude of the subsynchronous current, with the threshold set at 0.05 PU.

FIGS. 4 and 5 are graphs which illustrate the system time response, for either the FIG. 1 or FIG. 3 arrangements, for subsynchronous frequencies of 15 Hz. and 45 Hz., using a narrow band filter having a bandwidth of 3 Hz. FIG. 4 displays detection time versus threshold setting for a 1 PU subsynchronous current transient, and FIG. 5 shows the detection time versus the magnitude of the subsynchronous current for a threshold of 0.05 PU. It will be noted that the detection time versus magnitude is an inverse characteristic similar to the characteristics of a conventional inverse time overcurrent relay.

Figure 6:
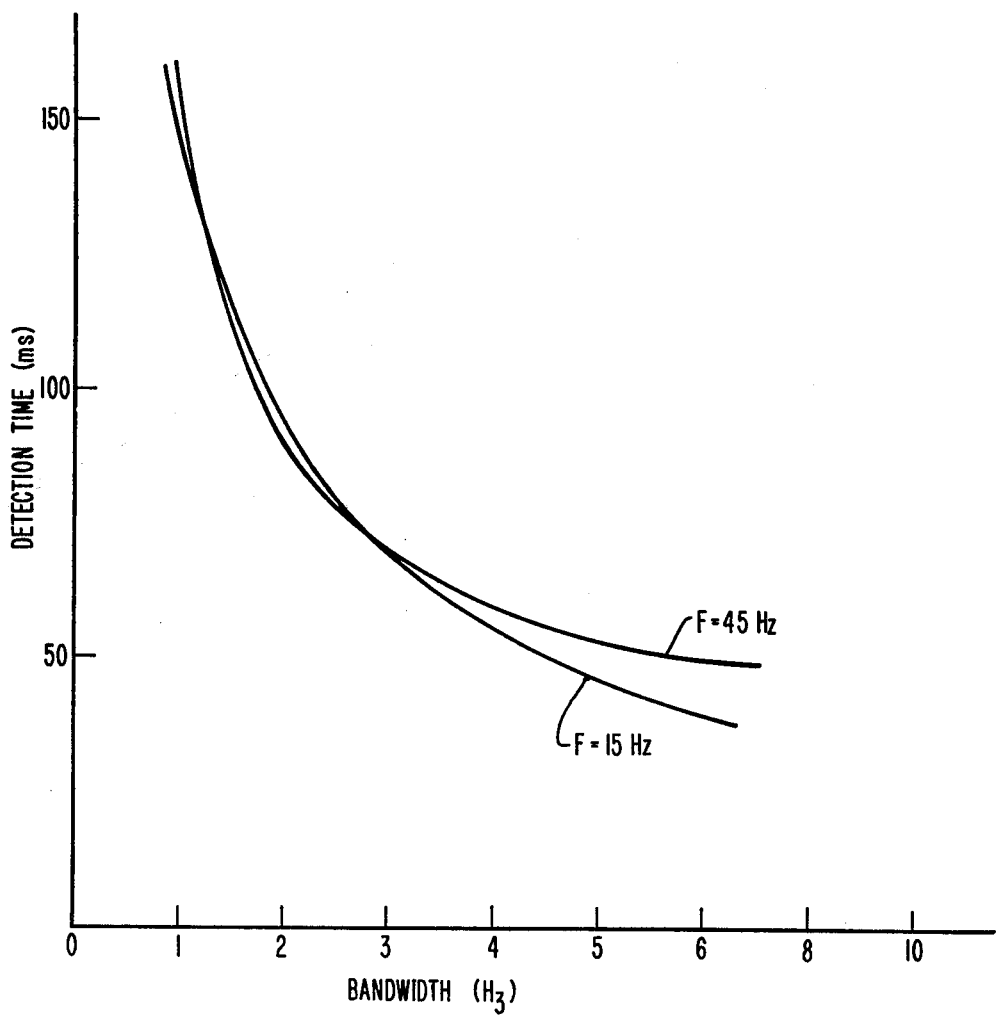
FIG. 6 is a graph which illustrates detection time of the protective relay apparatus of the invention, versus the bandwidth of a narrow band filter, for a specific subsynchronous frequency, for a transient of 1 PU, with the threshold set at 0.05 PU.

FIG. 6 is a graph which illustrates detection time versus the bandwidth of the narrow band filter, for subsynchronous current frequencies of 15 Hz. and 45 Hz., with a 0.05 PU threshold and a 1 PU subsynchronous current transient. It will be noted that detection time can be decreased at all subsynchronous current frequencies of interest by increasing the bandwidth. Thus, it is a compromise between the sensitivity at a selected frequency versus detection time.

The data for the graphs of FIGS. 4, 5 and 6 was obtained from computer simulation, in order to verify that the protective relay 10 will indeed provide accurate and reliable protection within the desired time response requirements.

The detection system which utilizes the signals responsive to the positive sequence components of the subsynchronous current at predetermined frequencies include a transient detector, and a self-excited detector, for each monitored frequency. For example, a transient detector 92 and a self-excited detector 94 are connected to receive the subsynchronous current signal having a frequency F1 at terminal 51, a transient detector 96 and a self-excited detector 98 are connected to receive the subsynchronous current signals having a frequency F2 at terminal 57, a transient detector 100 and a self-excited detector 102 are connected to receive the subsynchronous current signal having a frequency F3 at terminal 63, and a transient detector 104 and a self-excited detector 106 are connected to receive the subsynchronous current signals having a frequency FN at terminal 69.

The transient detectors and self-excited detectors examine the signals, and if they meet predetermined parameters, a signal will be issued indicating some sort of corrective action should be taken. The outputs of the transient detectors 92, 96, 100 and 104 may be OR'ed in an OR circuit 108, with the output of the OR circuit 108 being applied to a trip indicator 110, and to a trip circuit 112. The trip circuit 112, for example, may be connected to the trip coil 114 of a circuit breaker, which is connected to trip the generator from the line.

In like manner, the outputs of the self-excited detectors 94, 98, 102 and 106 are OR'ed in OR circuit 116, with the output of OR circuit 116 being connected to a trip indicator 118, and to the trip circuit 112.

The self-excited detectors 94, 98, 102 and 106 detect subsynchronous current oscillations which start the relatively low magnitudes and which grow in intensity, and these detectors may be the same as the detector described in detail in incorporated application Ser. No. 757,178. In this arrangement, a trip signal is provided after a predetermined evaluation period, in order to evaluate the rate of rise of the subsynchronous current signal. If the signal exceeds a predetermined threshold magnitude, and if its rate of rise exceeds a predetermined magnitude, a trip signal is issued.

The present invention recognizes that a transient of a predetermined subsynchronous frequency, which exceeds a predetermined relatively large magnitude, which transient is initiated from the line or electrical system, may shock the mechanical system of the turbine generator into resonance. The self-excited detector of the incorporated application provides a trip signal only when the rate of rise of the subsynchronous oscillation exceeds a predetermined magnitude. An electrically-caused transient will start high and decay. The resulting mechanical resonance, initiated by the electrical transient, will start low and grow. The self-excited detector system of the incorporated application will detect the latter.

Figure 7:
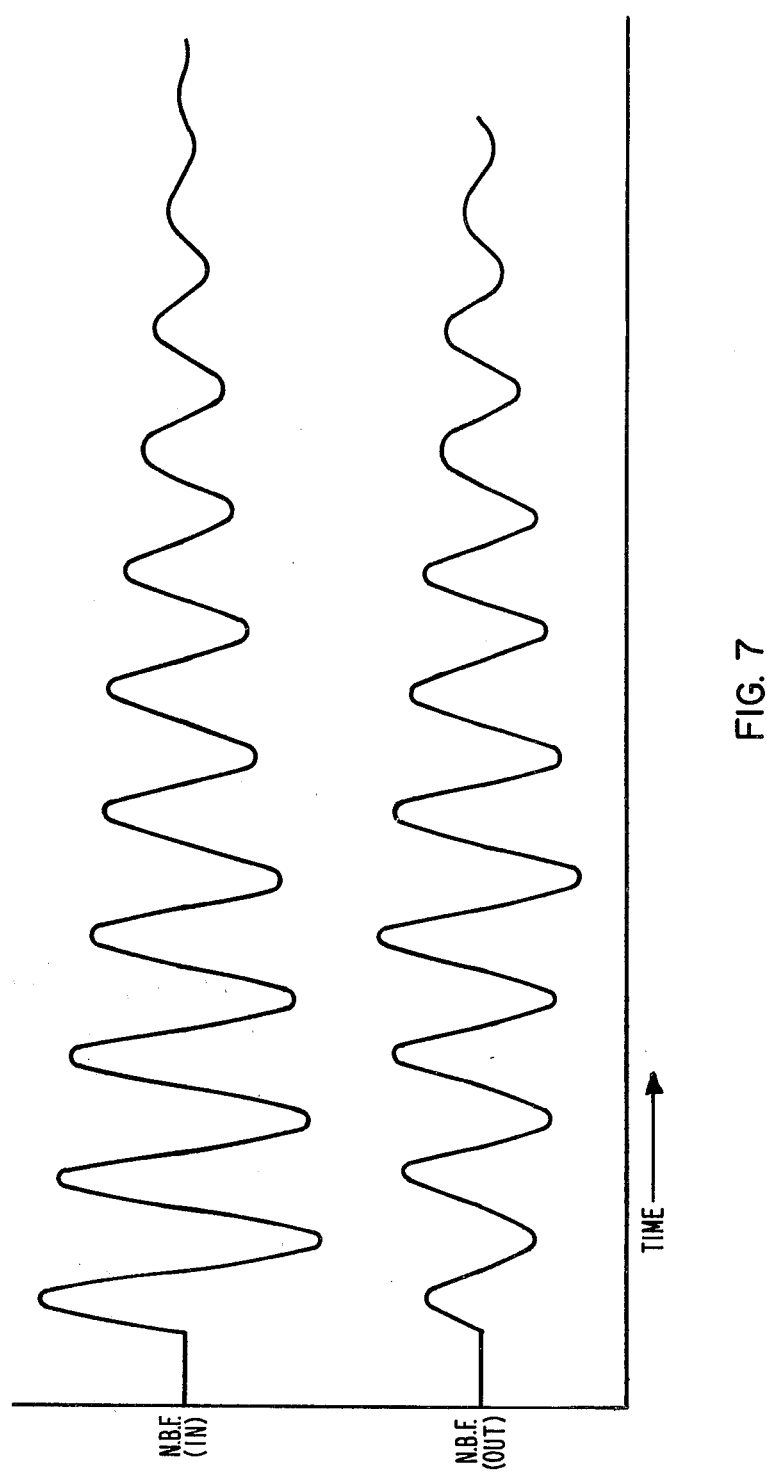
FIG. 7 is a graph which illustrates that a large initial value, decaying transient subsynchronous oscillation applied to the input of a narrow band filter, may appear as a growing signal at its output.

The narrow band filters of the invention may have the effect of providing an output which indicates a growing signal in response to a large decaying transient being applied to its input, as illustrated in FIG. 7. The narrow band filter cannot track the large initial amplitude of the transient, and its output may thus increase for a few cycles, before it starts to track the decaying signal. Thus, the self-excited detectors may issue a trip signal before the growing self-excited oscillation of the mechanical system has a chance to start.

In addition to this earlier detection of a large electrically-initiated decaying transient, the present invention provides separate transient detectors 92, 96, 100 and 104, which operate on magnitude alone, and they are thus not delayed in issuing a trip signal by the requirement of determining the rate of rise. It is known that electrically-initiated transients of a predetermined frequency, will shock the mechanical system into resonance, if the transient exceeds a predetermined magnitude. Thus, the transient detectors are set to initiate a trip signal if this predetermined magnitude is exceeded.

Figure 8:
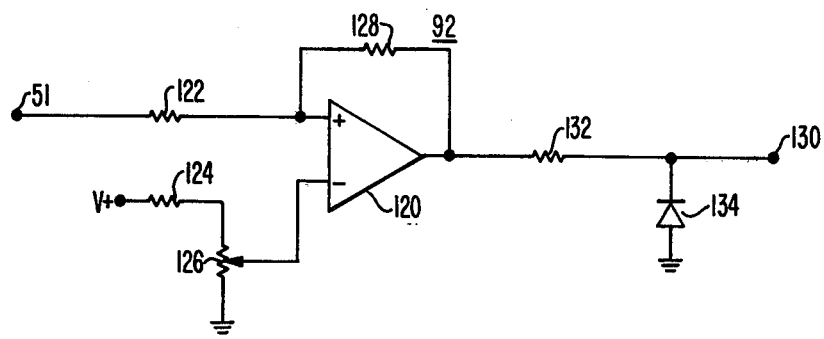
FIG. 8 is a schematic diagram of a circuit which may be used to provide the transient detecting function shown in block form in FIG. 1.

The transient detectors may simply be a level detector, with FIG. 8 illustrating a transient level detector which may be used for detector 92, and the other transient detectors. Transient detector 92 includes an operational amplifier (OPAMP) 120 which has its non-inverting input connected to terminal 51 via a resistor 122, to receive a signal representative of a subsynchronous current at frequency F1. The inverting input of OPAMP 120 is connected to an adjustable reference voltage provided by voltage source V+ and resistors 124 and 126. Resistor 126 is an adjustable resistor, with its selector arm being connected to the inverting input of OPAMP 120. The output of OPAMP 120 is connected to its non-inverting input via feedback resistor 128, and to an output terminal 130 via a resistor 132. A diode 134 prevents the output from going more than 0.6 volt negative. Output terminal 130 is connected to OR circuit 108. Thus, the detection apparatus of the present invention will issue a trip signal when an electrically-initiated transient of high initial magnitude is generated at a monitored subsynchronous frequency, with its trip signal being initiated before the turbine generator has a chance to start building up potentially-damaging oscillations due to mechanical resonance.

We claim:

1. Apparatus for providing output signals responsive to subsynchronous current flowing in a three-phase electrical power system having a three-phase voltage generated at a synchronous power generating frequency, comprising:
    first means providing first, second and third signals, each responsive to the current flowing in a different phase of the three-phase electrical power system,
    second means providing a fourth signal at the synchronous frequency having a constant amplitude,
    third means processing each of said first, second and third signals with said fourth signal, to provide fifth, sixth and seventh signals, respectively, each having first, second and third components, said first, second and third components having frequencies responsive to (1) twice the synchronous frequency, (2) the sum of each subsynchronous frequency and the synchronous frequency, and (3) the difference between each subsynchronous frequency and the synchronous frequency,
    wideband filter means tuned to pass said third component and to substantially block said first and second components, of said fifth, sixth and seventh signals,
    and a first pair of filters tuned to a first predetermined subsynchronous frequency, said first pair of filters including sequence filter means and narrow band filter means,
    said first pair of filters and said wideband filter means cooperatively providing an output signal responsive to the positive sequence component of any subsynchronous currents flowing in the three-phase electrical power system at said first predetermined subsynchronous frequency, in response to said fifth, sixth and seventh signals.

2. The apparatus of claim 1 including a second pair of filters, similar to the first pair, except tuned to a second predetermind subsynchronous frequency, said second pair of filters and the wideband filter means cooperatively providing an output signal responsive to the positive sequence component of any subsynchronous current flowing in the three-phase electrical power system at said second predetermined subsynchronous frequency, in response to the fifth, sixth and seventh signals.

3. The apparatus of claim 1 wherein the third means multiplies each of the first, second and third signals with the fourth signal, with the fifth, sixth and seventh signals being the products of such multiplication, respectively, and the sequence filter means includes a negative sequence filter, which provides a positive sequence component in response to said products.

4. The apparatus of claim 1 wherein the wideband filter means includes first, second and third wideband filters having inputs connected to filter the fifth, sixth and seventh signals, respectively, and outputs applied to the first pair of filters.

5. The apparatus of claim 1 including a plurality of additional pairs of filters, similar to the first pair of filters except each tuned to a different subsynchronous frequency, and wherein the wideband filter means includes first, second and third wideband filters having inputs connected to filter the fifth, sixth and seventh signals, respectively, and outputs applied to each of the first and additional pairs of filters.

6. The apparatus of claim 1 wherein the sequence filter of the first pair of filters is connected to be responsive to the fifth, sixth and seventh signals, the wideband filter means is connected to process the output of the sequence filter, and the narrow band filter is connected to process the output of the wide band filter means.

7. The apparatus of claim 1 including a plurality of additional pairs of filters, similar to the first pair of filters except each tuned to a different subsynchronous frequency, with the sequence filters of the first and additional pairs of filters each being connected to be responsive to the fifth, sixth and seventh signals, and the wideband filter means includes a separate wide band filter for each of the first and additional pairs of filters.

8. The apparatus of claim 1 including detector means responsive to the output signal, said detector means providing a trip signal in response to predetermined parameters of said output signal.

9. The apparatus of claim 8 wherein the detector means includes first detector means which detects self-excited subsynchronous current oscillations having a relatively low initial amplitude, and second detector means which detects transient initiated subsynchronous current oscillations having a relatively large initial amplitude.

10. The apparatus of claim 9 wherein the first detector mean includes means responsive to the rate of rise of the output signal, necessitating a delay in the issuance of a trip signal for at least a predetermined evaluation period, and the second detector means includes means for issuing a trip signal immediately when the output signal exceeds a predetermined magnitude.

* * * * *